United States Patent [19]
Ruhl

[11] 3,915,053
[45] Oct. 28, 1975

[54] FASTENER WITH PROPORTIONED STRENGTH LOCK GROOVES

[75] Inventor: John Howland Ruhl, Birmingham, Mich.

[73] Assignee: Huck Manufacturing Company, Detroit, Mich.

[22] Filed: Aug. 26, 1974

[21] Appl. No.: 500,583

[52] U.S. Cl. ........................................ 85/7; 85/1 T
[51] Int. Cl.² .................................... F16B 19/05
[58] Field of Search............ 85/7, 77, 78, 72, 32 T, 85/1 T, 5 R; 151/2; 52/758 F

[56] References Cited
UNITED STATES PATENTS

| 135,898 | 2/1873 | English | 151/14 R |
|---|---|---|---|
| 2,531,048 | 11/1950 | Huck | 85/5 R |
| 2,972,274 | 2/1961 | Bombard et al. | 85/5 R |
| 3,241,421 | 3/1966 | Siebol | 85/7 |
| 3,415,553 | 12/1968 | Baugh | 85/7 |
| 3,483,788 | 12/1969 | Keeler | 85/7 |
| 3,779,127 | 12/1973 | Speakman | 85/7 |
| 3,792,933 | 2/1974 | Stencel | 85/7 |

FOREIGN PATENTS OR APPLICATIONS

| 672,946 | 5/1952 | United Kingdom | 85/1 T |

Primary Examiner—Marion Parsons, Jr.
Attorney, Agent, or Firm—Harness, Dickey & Pierce

[57] ABSTRACT

A new fastener having stiffness proportioned and/or strength proportioned lock grooves to enable predetermined load distribution across the lock grooves.

7 Claims, 14 Drawing Figures

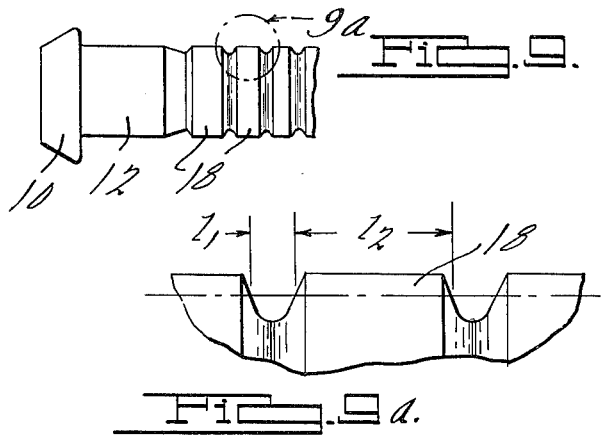
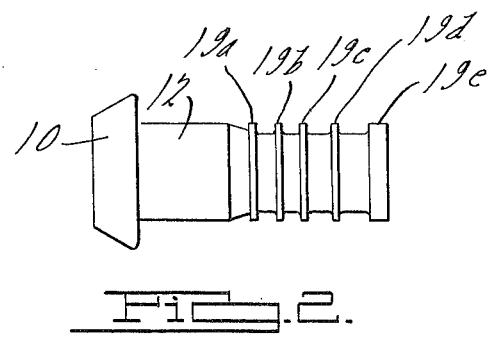
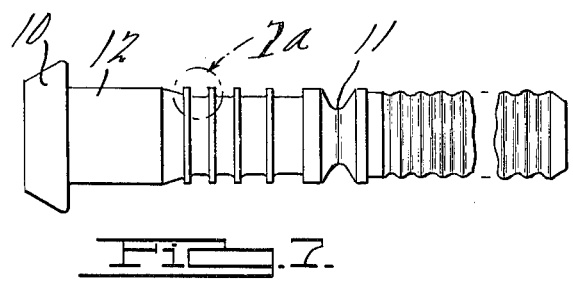
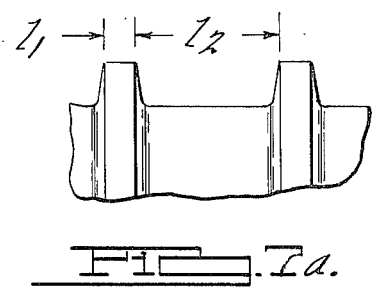
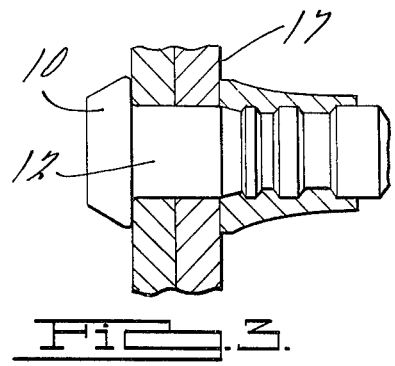
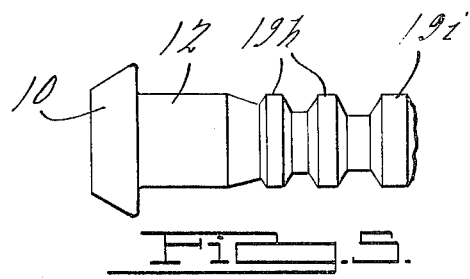
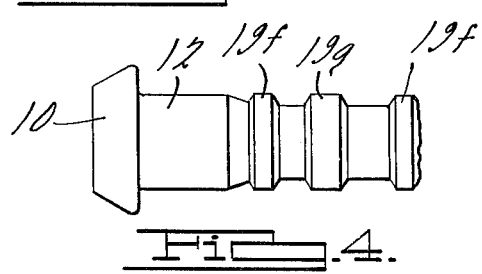
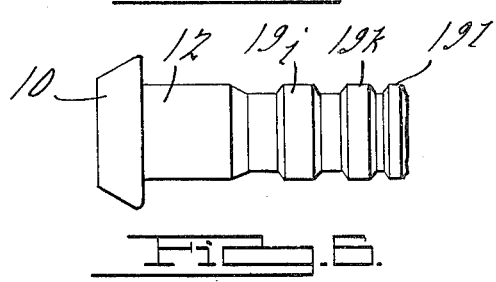
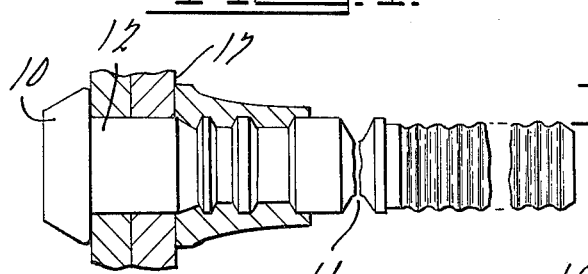
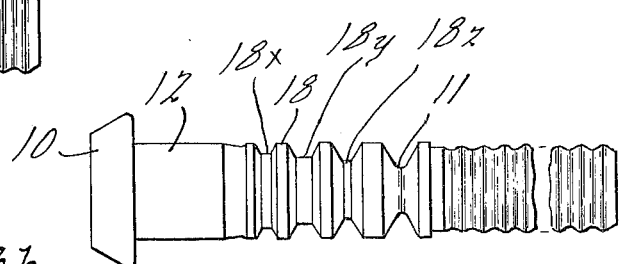

FASTENER WITH PROPORTIONED STRENGTH LOCK GROOVES

BACKGROUND OF THE INVENTION

This invention broadly relates to a new fastener and more particularly the invention relates to a new fastener having a specially constructed and proportioned thread or shoulder and groove system.

Accordingly one object of the invention is to provide a new and improved fastener having a head and a shank portion and a collar member fastened thereon, in which fastener there are a plurality of specially designed and proportioned locking grooves.

Another object of the present invention is to provide a new fastener wherein the shoulder and groove shear area between the shank and the collar is divided proportionately in accordance with the respective strengths of the shank and collar constructional materials.

Another object of the present invention is to provide a novel fastener which includes a shoulder and groove shear area relationship that is proportioned in a predetermined manner and wherein the shoulder and/or groove construction is significantly non-uniform in dimension, when measured from the axial direction or the radial direction.

Another object of the present invention is to provide a new fastener having a plurality of proportioned strength shoulder and/or groove means which provide a substantially uniform load transfer to the shank portion of the fastener which is in contact with the collar member.

Another object of the present invention is to reduce fastener weight and to produce a fastener system that has greater tensile strength and less chance of fatigue or stress corrosion failures.

Other objects, features and advantages of the present invention will become apparent in the subsequent description and the appended claims taken in conjunction with the accompanying drawings.

BRIEF DESCRIPTION OF THE DRAWINGS

FIGS. 2, 3, 4, 5, and 6 illustrate stump versions of fasteners prepared in accordance with the invention herein, FIGS. 7 and 7a illustrate a lock bolt version of a fastener prepared in accordance with the invention herein, FIGS. 8a and 8b illustrate further embodiments of lock bolt versions of fasteners prepared in accordance with the invention herein, FIGS. 9 and 9a illustrate a stump version of a fastener prepared in accordance with the invention herein in which embodiment the pin material is softer than the collar material which is to be used therewith.

SUMMARY OF THE INVENTION

In accordance with the invention discovered and disclosed herein it has now been found that through proportioning the thread and/or groove tensile strength and shear strength it is possible to produce thread/groove shear areas in the pin and collar or nut that are proportioned to the shear strength of the materials used. This uniquely permits the tension failure to be adjusted so as to have the shank threads fail first or to have the collar threads fail first, or to have both the shank and collar adjusted to fail at approximately the same load. In the latter case where it is adjusted to fail at the same load, the maximum strength per thread or groove can be obtained for any combination of shank and collar material. In the case where either the pin or collar is desired to fail first, it is then possible to reduce the thread shear area of the desired weakest component and increase the thread shear area of the other component. In the case of lock grooves or zero lead threads, a groove or thread pitch distance can be varied between the pin and collar to any desired degree. The principle of this invention can be used to produce lighter weight, higher tensile strength, or controlled failure joint characteristics, in fasteners. The principle of the invention is premised on the discovery that it is possible to proportion the stiffness and/or strength of the threads or grooves to provide a predetermined load distribution across the axial length of the thread and groove connection.

To accomplish a uniform load distribution as described herein, the dimensions of the lock grooves should be varied such that the lock groove stiffness is increased as the distance from the work sheet line increases, and this is carried out by increasing the dimensions of the shear area of the lock grooves as said distance increases by increasing the depth and/or axial length dimensions of the lock grooves.

DESCRIPTION OF PREFERRED EMBODIMENTS

Without being limited by the specific embodiments shown, a description of the invention is now made with reference to the drawings, wherein like numerals in the different drawing figures indicate like elements.

Figure 1:
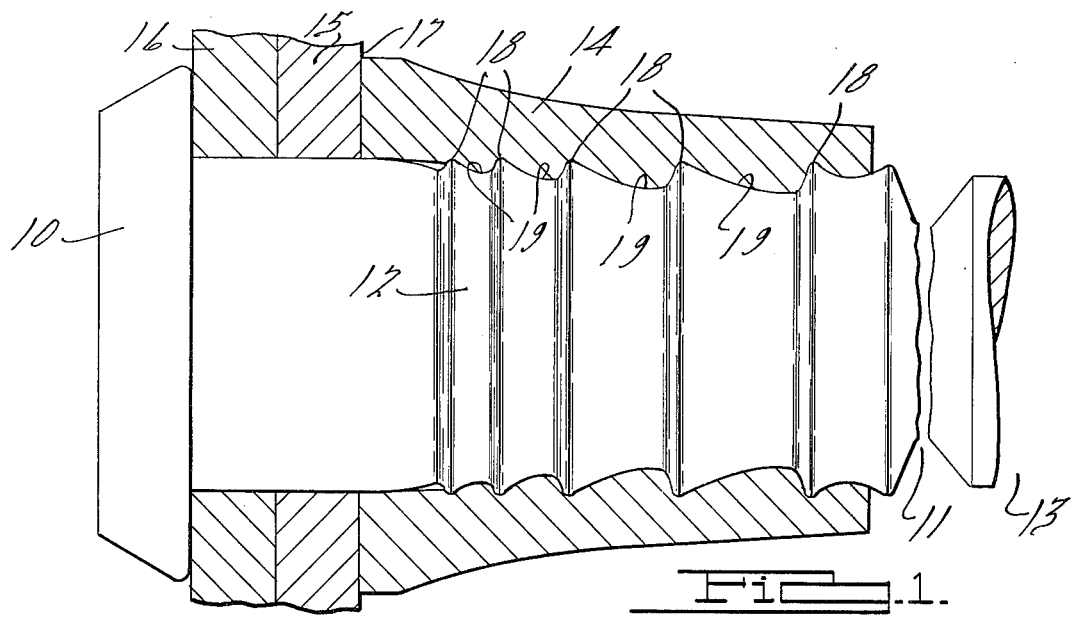
FIGS. 1, 1a, and 1b illustrate clinched fasteners combining proportioned strength and proportioned stiffness lock grooves in accordance with the invention herein.
Figure 1A:
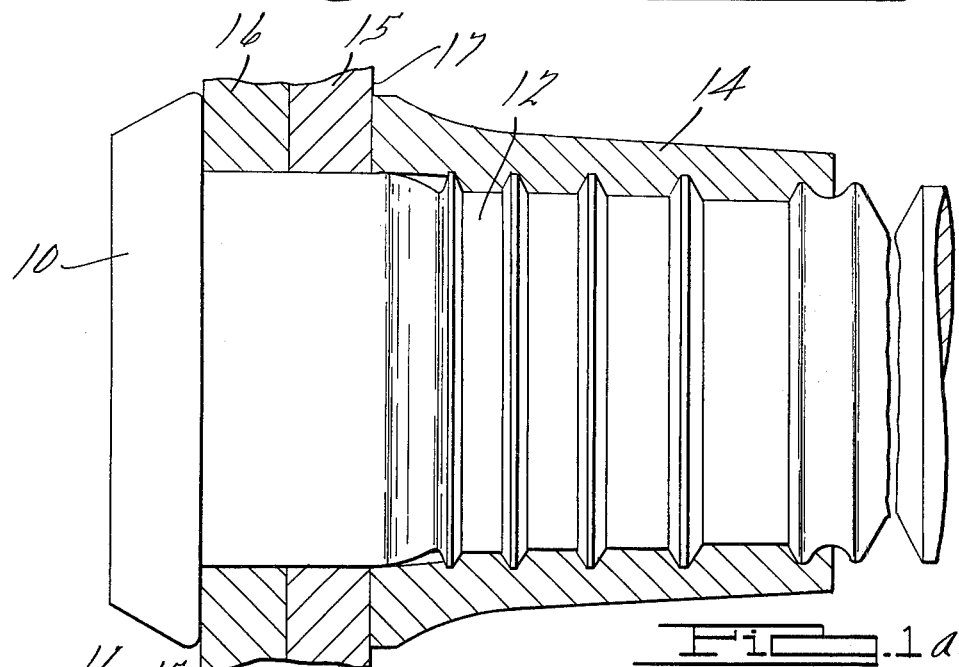
Figure 1B:
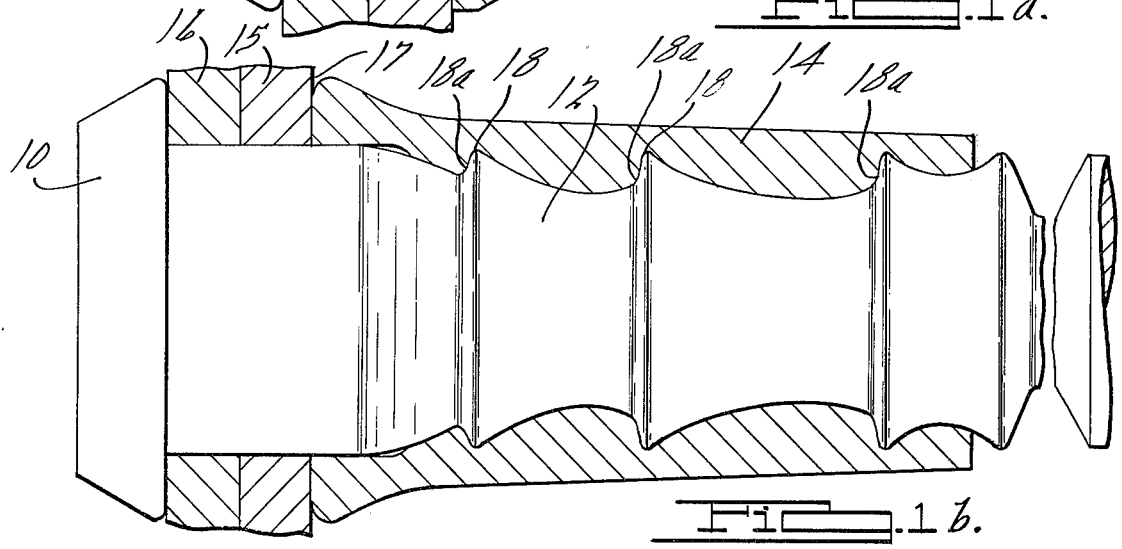

In FIGS. 1, 1a and 1b of the drawings, fasteners are illustrated having a head 10, a shank portion 12, and a collar member 14 swaged thereon for holding the workpieces 15, 16. It is to be noted that each annular shoulder or thread 18 in the fasteners is proportionately spaced further apart one from another as the distance from the sheet line 17 of the workpieces is increased. Similarly each of the grooves 19 is increased in width as the distance from the sheet line 17 is increased. The fastener is typically installed in the known manner by a pull tool grasping the pin tail 13 and pulling the fastener such that the workpieces 15, 16 are clinched together whereafter the collar 14 in position on the shank 12 is swaged onto the fastener threads 18 in tight relationship therewith to clinch the workpieces together, and with the pin tail 13 subsequently being broken away at the breakneck area designated 11.

It is well known in the fastener art that the first one or two threads adjacent to the sheet line in a clinched fastener take up essentially most of the load in the fastener and it is only when these first one or two threads begin to deflect that some of the load is transferred to the subsequent outer threads of the fastener. The present invention in one aspect uniquely overcomes this problem by reducing the dimensions of the lock groove which is closest to the sheet line and enlarging in a proportionate manner each subsequent groove in relation to its distance from the sheet line 17 as shown in any of FIGS. 1, 1a, or 1b. In corresponding fashion the threads 18 in FIGS. 1, 1a, 1b are dimensioned such that the distance between threads is proportionately increased in relationship to the distance of the threads from the sheet line. Thus the load accepted by each lock groove as shown in FIGS. 1, 1a or 1b is made to be more uniformly shared by all of the lock grooves across the collar from the sheet line 17 to the breakneck area designated 11.

In order to carry out the above inventive concept the dimensions of the lock grooves may be proportionately increased in an axial direction or the depth of the lock grooves may be increased in a radial direction, or both dimensions may be increased as distance from the sheet line increases.

With regard to the fastener embodiment shown in FIG. 1b, it is to be noted that the effectiveness of the threads 18 is increased by tilting or orienting the threads such that they are in a direction opposed to the workpieces thus improving the efficiency of the lock grooves. That is, the mass within the lock groove which must be sheared before the collar will begin to break away from the fastener shank is rendered more efficient because the mass within the lock groove must ride up over a wall 18a of the thread which is effectively tilted such that it is generally perpendicular to the collar mass as opposed to being sloped away from the sheet line as shown in the thread of FIG. 1a.

FIGS. 2, 3, 4, 5, and 6 illustrate stump versions of a fastener prepared in accordance with the invention herein, and FIG. 3 shows the preferred form thereof with a collar member swaged thereon. For example, in FIG. 3 it is to be noted that the first thread 19a, which is most closely adjacent to the sheet line 17, is the thread of the least mass thickness and would be the most flexible thread. The second thread 19b would be the next most flexible thread, and the next thread 19c would be the stiffest thread. The embodiment as shown in FIG. 3 would generally give a more uniform load distribution across the length of the swaged collar member.

Similarly in FIG. 2 the fastener shank includes threads 19a, 19b, 19c, 19d, and 19e which are each proportionately dimensioned such that they are of wider spacing as the distance from the workpiece line increases. Thus the fastener embodiment prepared with a pin as in FIG. 2 would also give a more uniform load distribution across the swaged collar member to be subsequently applied thereto. In the FIG. 4 embodiment the two threads designated 19f are of the same dimensions and the middle thread 19g being of wider dimension would be of greater stiffness than either of the threads 19f on either side thereof. Thus a fastener design as in FIG. 4 would concentrate the load distribution on the stiffest thread 19g which would generally be positioned centrally within the swaged collar member. In the FIG. 5 embodiment the first two threads 19h are of similar dimensions whereas the next outermost thread 19i is of increased dimension, with this embodiment generally serving to concentrate the load carrying ability of the clinched fastener near the outer portion of the swaged collar that is, the portion of the collar positioned away from the workpieces. In the embodiment of FIG. 6 the thread 19j closest to the workpieces is of the widest axial dimensions and thus it would be the stiffest thread whereas the next thread 19k would be of lesser stiffness to do its lesser dimension and the thread 19l would be of lesser stiffness than the thread 19k. This optional and non-preferred embodiment would generally serve to concentrate the load distribution at an area of the swaged collar near the workpieces.

FIGS. 7 and 7a illustrate a lock bolt version of a fastener prepared in accordance with the invention herein. FIG. 7a is an enlargement of the area within the circle designated 7a in FIG. 7. In the fastener of FIG. 7 the groove dimension $l_1$ of each thread remains uniform such that the stiffness of each said thread would be generally the same but with the proportioned strength being supplied by the variation of the lock grooves caused by the increasing dimension for each of the groove length.

FIGS. 8a and 8b illustrate two additional lock bolt versions of a fastener prepared in accordance with the invention herein. In the embodiment of FIG. 8a both the thread stiffness is increased and the groove dimension is increased as the distance from the workpiece line 17 increases. Thus the proportioned strength lock grooves are supplied in the embodiment of FIG. 8a by increasing the stiffness of each thread member in relationship to the distance of each thread member from the workpiece line as well as by increasing the mass within each lock groove in relationship to the increasing distance of each groove from the workpiece line.

In the embodiment of FIG. 8b the strength of each lock groove is increased as the distance from the workpiece is increased by making the depth of each successive groove 18x, 18y, 18z, deeper within the shank or pin 12. The size of the threads 18 in the embodiment of FIG. 8b are also progressively slightly increased as the distance from the workpieces increases.

FIGS. 9 and 9a illustrate another stump version of a fastener prepared in accordance with this invention. FIG. 9a is an enlarged view of the portion shown within the circular area designated 9a in FIG. 9. In this version of a fastener in accordance with this invention the pin material 12 is softer than the collar material 14. Thus the pin threads 18 are markedly increased in their axial width and the dimension $l_2$ is progressively increased for each thread as the distance of the thread from the workpiece line increases. The dimension $l_1$ of the groove as shown in FIG. 9a can also be progressively increased as desired.

While it will be apparent that the preferred embodiments of the invention disclosed are well calculated to fulfill the objects above stated it will be appreciated that the invention is susceptible to modification, variation and change without departing from the proper scope or fair meaning of the subjoined claims.

What is claimed is:

1. A fastener having a head and a shank portion, and a swage collar member fastened thereon for holding workpieces, said fastener having at least three differently proportioned strength locking annular shoulder and groove means for providing a predetermined desired load distribution across the shank portion which is generally coextensive with the collar to the sheet line of the workpiece, said plurality of locking shoulder and groove means being non-uniform in dimensions and wherein, each of said groove means increases in size as distance from the sheet line increases and, said shoulder and groove means provide proportioned stiffness such that the shoulder and groove means fail at approximately the same load to thereby provide the maximum strength for the fastener and being operative to prevent shear stress from being taken up at only a shoulder which is closely adjacent to the sheet line.

2. The invention of claim 1 wherein,
the shoulder and groove shear area between the shank and collar is divided proportionately in relation with their respective strengths to give proportioned stiffness lock grooves across the axial length of the collar.

3. The invention of claim 1 wherein,
the shoulders are tilted toward the workpiece line to increase the effective strength of the fastener.

4. The invention of claim 1 wherein,
each of said shoulder means increases in size as distance from the sheet line increases.

5. The invention of claim 1 wherein,
said fastener includes a shoulder and/or groove shear area relationship that is proportioned in a predetermined desired manner, and said proportioned strength shoulder and groove means are significantly non-uniform in dimension.

6. The invention of claim 1 wherein,
the shank shoulders are designed to fail first.

7. The invention of claim 1 wherein,
the collar shoulders are designed to fail first.

* * * * *